United States Patent
Li et al.

(10) Patent No.: US 9,305,540 B2
(45) Date of Patent: *Apr. 5, 2016

(54) FREQUENCY DOMAIN SIGNAL PROCESSOR FOR CLOSE TALKING DIFFERENTIAL MICROPHONE ARRAY

(71) Applicant: National Semiconductor Corporation, Santa Clara, CA (US)

(72) Inventors: Yunhong Li, Santa Clara, CA (US); Lin Sun, Sunnyvale, CA (US); Wei Ma, San Ramon, CA (US)

(73) Assignee: NATIONAL SEMICONDUCTOR CORPORATION, Santa Clara, CA (US)

( * ) Notice: Subject to any disclaimer, the term of this patent is extended or adjusted under 35 U.S.C. 154(b) by 359 days.

This patent is subject to a terminal disclaimer.

(21) Appl. No.: 13/734,114

(22) Filed: Jan. 4, 2013

(65) Prior Publication Data

US 2013/0121499 A1    May 16, 2013

Related U.S. Application Data

(63) Continuation of application No. 11/684,076, filed on Mar. 9, 2007, now Pat. No. 8,363,846.

(51) Int. Cl.
  G10K 11/178    (2006.01)
  H04M 1/60    (2006.01)

(52) U.S. Cl.
  CPC ............ *G10K 11/178* (2013.01); *H04M 1/6008* (2013.01)

(58) Field of Classification Search
  None
  See application file for complete search history.

(56) References Cited

U.S. PATENT DOCUMENTS

| | | | |
|---|---|---|---|
| 5,581,620 A | 12/1996 | Brandstein et al. | |
| 7,277,550 B1 * | 10/2007 | Avendano et al. | 381/94.2 |
| 7,672,466 B2 * | 3/2010 | Yamada et al. | 381/94.7 |
| 7,920,652 B2 * | 4/2011 | Hayase et al. | 375/324 |
| 2001/0033583 A1 | 10/2001 | Rabenko et al. | |
| 2002/0013695 A1 * | 1/2002 | Belt et al. | 704/205 |
| 2003/0147538 A1 | 8/2003 | Elko | |
| 2006/0013412 A1 | 1/2006 | Goldin | |
| 2006/0269004 A1 * | 11/2006 | Ibrahim et al. | 375/260 |

OTHER PUBLICATIONS

Taiwan Search Report, 097108122. 1 pg. Mar. 7, 2008.
PCT Search Report PCT/US08/56007. 1 pg. Jul. 25, 2008.
Taiwan Search Report, 097108122, dated Mar. 9, 2007, one page.
PCT Search Report, PCT/US08/56007, dated Jul. 25, 2008, one page.

* cited by examiner

*Primary Examiner* — Curtis Kuntz
*Assistant Examiner* — Qin Zhu
(74) *Attorney, Agent, or Firm* — Andy Viger; Frank D. Cimino

(57) ABSTRACT

A system and method for processing close talking differential microphone array (CTDMA) signals in which incoming microphone signals are transformed from time domain signals to frequency domain signals having separable magnitude and phase information. Processing of the frequency domain signals is performed using the magnitude information, following which phase information is reintroduced using phase information of one of the original frequency domain signals. As a result, high pass filtering effects of conventional differential signal processing of CTDMA signals are substantially avoided.

20 Claims, 3 Drawing Sheets

FREQUENCY DOMAIN SIGNAL PROCESSOR FOR CLOSE TALKING DIFFERENTIAL MICROPHONE ARRAY

CROSS-REFERENCE TO RELATED APPLICATIONS

This application is a continuation of U.S. patent application Ser. No. 11/684,076, filed on Mar. 9, 2007, which is hereby incorporated by reference for all purposes.

BACKGROUND

1. Field of the Invention

The present invention relates to microphone arrays and in particular, to filtering and processing circuits for differential microphone arrays.

2. Description of the Related Art

With the seemingly ever increasing popularity of cellular telephones, as well as personal digital assistances (PDAs) providing voice recording capability, it has become increasingly important to have noise canceling microphones capable of operating in noisy acoustic environments. Further, even in the absence of excessive background noise, noise canceling microphones are nonetheless highly desirable for certain applications, such as speech recognition devices and high fidelity microphones for studio and live performance uses.

Such microphones are often referred to as pressure gradient or first order differential (FOD) microphones, and have a diaphragm which vibrates in accordance with differences in sound pressure between its front and rear surfaces. This allows such a microphone to discriminate against airborne and solid-borne sounds based upon the direction from which such noise is received relative to a reference axis of the microphone. Additionally, such a microphone can distinguish between sound originating close to and more distant from the microphone.

For the aforementioned applications, so called close-talk microphones, i.e., microphones which are positioned as close to the mouth of the speaker as possible, are seeing increasing use. In particular, multiple microphones are increasingly configured in the form of a close-talking differential microphone array (CTDMA), which inherently provide low frequency far field noise attenuation. Accordingly, a CTDMA advantageously cancels far field noise, while effectively accentuating the voice of the close talker, thereby spatially enhancing speech quality while minimizing background noise. (Further discussion of these types of microphones can be found in U.S. Pat. Nos. 5,473,684, and 5,586,191, the disclosures of which are incorporated herein by reference.)

While a CTDMA generally works well for its intended purpose, its differential connection, i.e., where one microphone signal is subtracted from another, will typically boost the internal noise. The action of the differential summing, i.e., signal subtraction, generally increases, e.g., doubles, the internal noise. Additionally, following this differential summation, the signal needs to be amplified, e.g., 10-20 decibels, which also increases the internal circuit noise.

SUMMARY

In accordance with the presently claimed invention, a circuit, system and method are provided for processing close talking differential microphone array (CTDMA) signals in which incoming microphone signals are transformed from time domain signals to frequency domain signals having separable magnitude and phase information. Processing of the frequency domain signals is performed using the magnitude information, following which phase information is reintroduced using phase information of one of the original frequency domain signals.

In accordance with one embodiment of the presently claimed invention, a circuit for processing microphone signals is configured for use with a differential microphone array that includes a plurality of microphones each providing an analog microphone output. The circuit includes time-to-frequency domain conversion circuitry, frequency domain processing circuitry, phase recovery circuitry and frequency-to-time domain conversion circuitry.

The time-to-frequency domain conversion circuitry is operable to receive time domain microphone signals corresponding to respective analog microphone outputs, and to provide corresponding respective frequency domain microphone signals characterized by frequency domain magnitude and phase signals. The frequency domain processing circuitry is operable to process at least two frequency domain magnitude signals, and to provide a corresponding frequency domain processed magnitude signal. The phase recovery circuitry is operable to receive the frequency domain processed magnitude signal and at least one of the frequency domain microphone signals, and to provide a frequency domain resultant signal with magnitude information corresponding the frequency domain processed magnitude signal and phase information corresponding to the phase of the at least one frequency domain microphone signal. the Frequency-to-time domain conversion circuitry is operable to convert the frequency domain resultant signal to a time domain resultant signal.

In other embodiments of the presently claimed invention, (a) processing the at least two frequency domain magnitude signals is performed in relation to a microphone compensation signal related to a difference in frequency response characteristics of at least two microphones that provide the analog microphone outputs corresponding to the least two frequency domain magnitude signals; and (b) processing the at least two frequency domain magnitude signals is performed in relation to a determination of when the phase difference between the at least two time domain microphone signals is within a predetermined proximity to 90 degrees.

DETAILED DESCRIPTION

Figure 1:
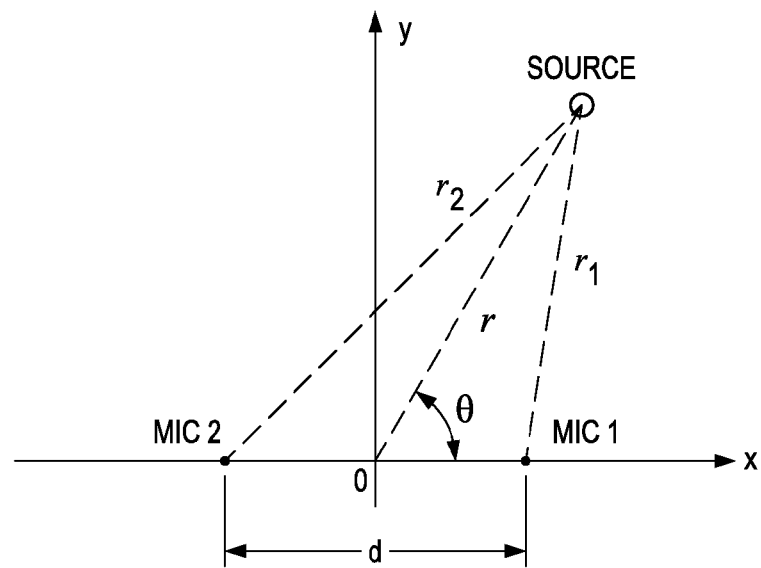
FIG. 1 illustrates the geometry of a FOD microphone array.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

In a conventional CTDMA design, the output is formed by the difference of the signals received in two closely placed microphones. Through the differential operation, far-field noise is attenuated while the desirable signal in the near-field receives less attenuation, thereby producing an overall signal-to-noise ratio (SNR) improvement.

A conventional CTDMA is known to have a high pass effect on its output because the differential operation is equivalent to a high pass filter in the audible frequency range with the frequency response changing dynamically with the location of the near-field source. The fact that the near-field source generally cannot be treated as a point source further complicates the frequency response. A deterministic low pass filter can partially compensate for such low frequency loss but is inadequate to restore the original near-field signal frequency distribution. Others have proposed to dynamically estimate the location of the near-field source and then use that information to design an adaptive low pass filter to restore the output. However, such an estimation is not a trivial task for reliable implementation. Moreover, its accuracy decreases when far-field noise level is high.

The high pass effect of a conventional CTDMA also limits the SNR improvement which is inversely proportional to frequency in the range up to 3-4 kHz. For signals at higher frequencies, the SNR decreases. Thus a conventional CTDMA is generally limited to speech application below 4 kHz. Another issue is that phase mismatches among the microphones are larger at high frequencies, thereby further reducing potential SNR improvements.

Referring to FIG. 1, using a wave propagation model, the output voltage V(f) of a conventional FOD microphone array as a function of frequency can be written as $$V(f) = \frac{e^{-jkr_1}}{r_1} - \frac{e^{-jkr_2}}{r_2} \qquad (1)$$

where $k=2\pi/\lambda$ is the wave number with $\lambda$ being the wavelength.

Figure 2:
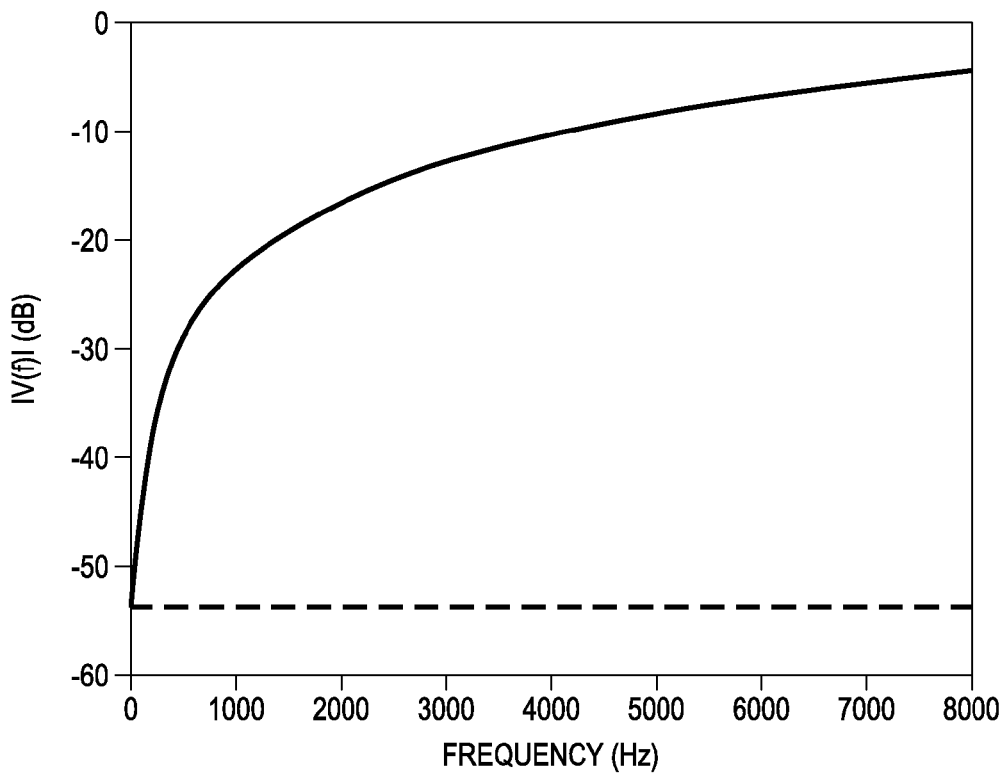
FIG. 2 illustrates a conventional frequency responses for a FOD microphone array and an improved frequency response for a FOD microphone array using signal processing in accordance with the presently claimed invention.

Referring to FIG. 2, the magnitude |V(f)| of the output voltage V(f), as depicted by the solid line plot, displays a high pass characteristic. Such a high pass effect in the conventional CTDMA results from subtraction of both amplitude and phase of the signals. In accordance with the presently claimed invention, the received time domain microphone signals are first transformed to the frequency domain, where signal amplitude and phase are separable and thus can be handled differently. The differential operation is applied only to the amplitudes of the signals, while the phase of the output is set to be the original phase from either one of the two input signals. Although the original phase may be contaminated with noise, it will not significantly affect the subjective quality since the human ear is substantially insensitive to phase distortion. Accordingly, the output voltage can be written as $$V'(f) = \left(\frac{1}{r_1} - \frac{1}{r_2}\right)e^{-jkr_2} \qquad (2)$$

Referring to FIG. 2, the magnitude |V'(f)| of the processed output voltage V(f), as depicted by the dashed line plot, displays a constant gain that is independent of frequency, i.e., the conventional high pass effect is avoided.

Regarding noise reduction performance of a CTDMA in terms of SNR improvement, it can be assumed that there is a virtual microphone at the origin, thereby allowing the input SNR to be defined as $$SNR_{in} = \frac{\sigma_s^2}{\sigma_n^2} \qquad (3)$$

where $\sigma_s^2$ and $\sigma_n^2$ represent the energy of the desired signal and ambient noise, respectively, as received by the virtual microphone.

The output SNR of the differential array can be written as $$SNR_{out} = \frac{\sigma_{s1}^2 - \sigma_{s2}^2}{\sigma_{n1}^2 - \sigma_{n2}^2} \qquad (4)$$

where $\sigma_{si}^2$ and $\sigma_{ni}^2$ represent the energy of the desired signal and ambient noise, respectively, as received by the ith microphone.

The improvement in SNR due to the differential array is defined as $$SNR_{diff} = \frac{SNR_{out}}{SNR_{in}} = \frac{\sigma_{s1}^2 - \sigma_{s2}^2}{\sigma_{n1}^2 - \sigma_{n2}^2} \frac{\sigma_n^2}{\sigma_s^2} \qquad (5)$$

where $SNR_{diff}$ is a function of the incoming angle of signal, source distance and signal frequency.

Figure 3:
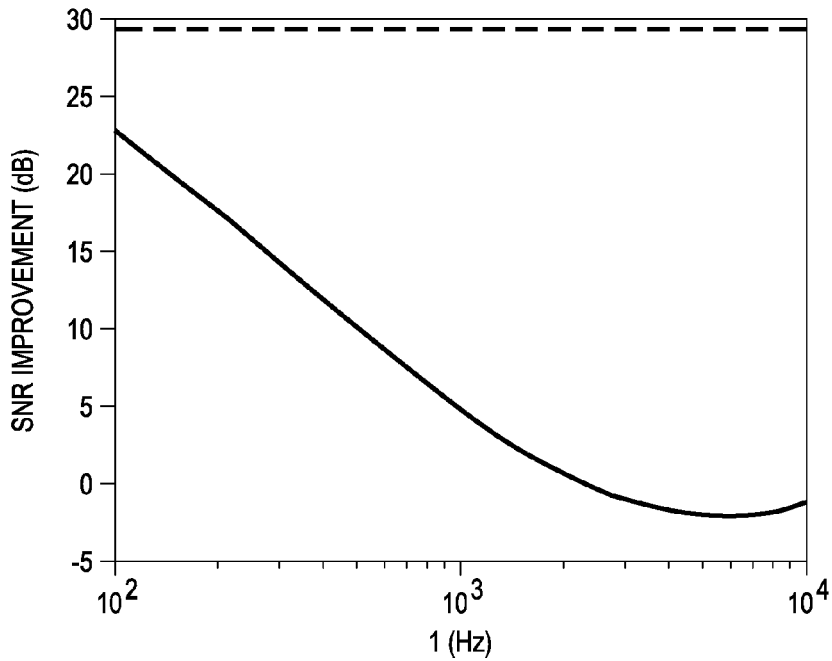
FIG. 3 illustrates a conventional SNR improvement for a FOD microphone array and an improved SNR improvement for a FOD microphone array using signal processing in accordance with the presently claimed invention.

Referring to FIG. 3, based on Equations (1), (2) and (5), the SNR improvement $SNR_{diff}$ as a function of frequency, as depicted by the dashed line plot, is constant over frequency, in contrast to the conventional SNR improvement as depicted by the solid line plot. (This comparison is based on the desired signal being 3 cm away, interference being 1 m away, and both arriving with an angle of incidence of 20 degrees). As can be seen, the SNR improvement in accordance with the presently claimed invention is significantly greater than that of a conventional system, particularly at high frequencies.

Figure 4:
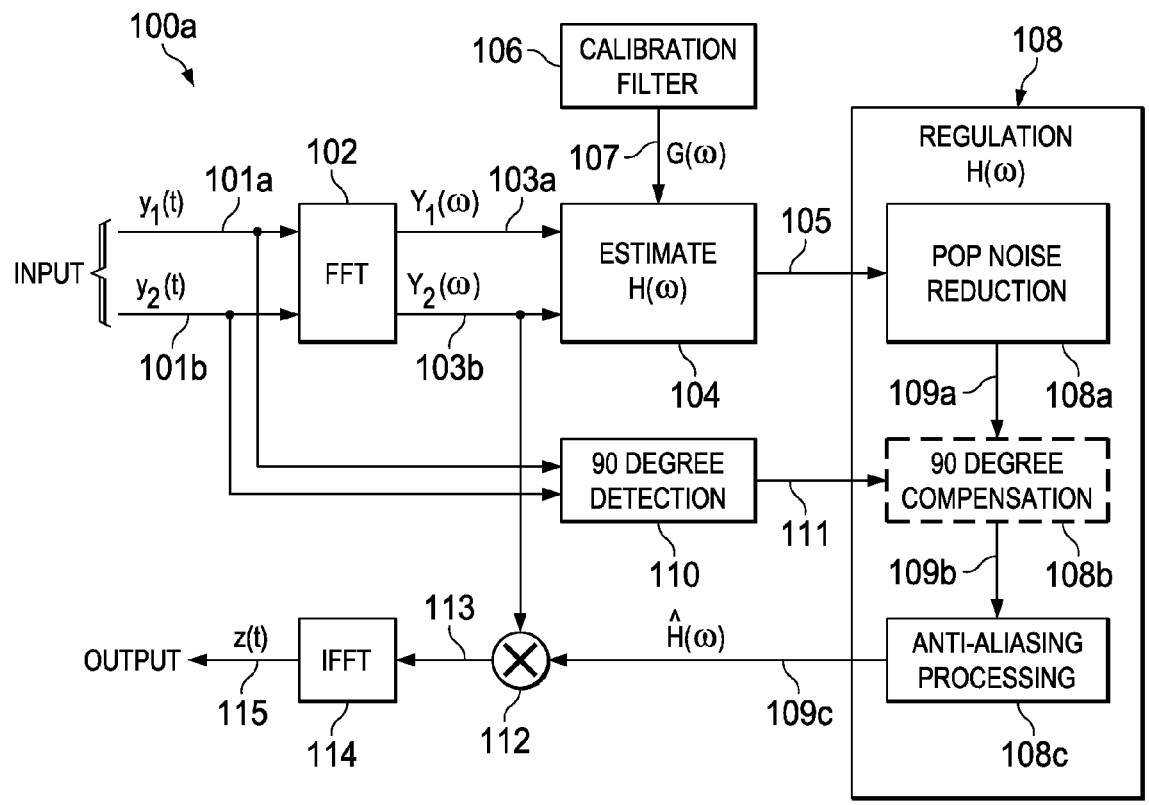
FIG. 4 is a block diagram for a frequency domain signal processor for a CTDMA in accordance with one embodiment of the presently claimed invention.

Referring to FIG. 4, in accordance with one embodiment 100a of the presently claimed invention, a frequency domain signal processor for a CTDMA includes Fast Fourier Transform (FFT) circuitry 102, estimation filter circuitry 104, calibration filter circuitry 106, regulation filter 108, quadrature signal detection circuitry 110, signal mixing circuitry 112, and Inverse Fast Fourier Transform (IFFT) circuitry 114, all interconnected substantially as shown. The incoming time domain signals 101*a*, 101*b*, originating from at least two microphones (not shown), are converted to corresponding frequency domain signals 103*a*, 103*b* by the FFT circuitry 102 in accordance with well known techniques. As discussed in more detail below, the frequency domain signals 103*a*, 103*b* are processed by the estimation filter circuitry 104 to produce a filtered signal 105. The calibration filter 106 contains predetermined filter data 107 which is used by the estimation filter 104 to compensate for differences in frequency responses of the microphones (not shown) responsible for the incoming signals 101*a*, 101*b*.

The filtered signal 105 is further processed by the regulation filter circuitry 108 to produce the final processed signal 109*c*. The incoming filtered signal 105 is processed by pop noise reduction circuitry 108*a* to reduce signal spikes and pop noise. The resulting processed signal 109*a* is processed by quadrature signal compensation circuitry 108*b* using a quadrature signal detection signal 111 provided by the quadrature signal detection circuitry signal 110, which determines when the phase difference between the incoming signals 101*a*, 101*b* is within a predetermined range of values above or below 90 degrees. The resulting compensated signal 109*b* is processed by anti-aliasing processing circuitry 108*c* to minimize signal aliasing in accordance with well known techniques.

The final processed signal 109*c*, for which signal phase has been disregarded, has its signal phase re-established by mixing this signal 109*c* in the signal mixer 112 with one of the two original frequency domain signals, e.g., the second frequency domain signal 103*b*. The resulting signal 113, now having both magnitude and phase information, is converted back to a time domain signal 115 by the IFFT circuitry 114 in accordance with well known techniques.

Figure 5:
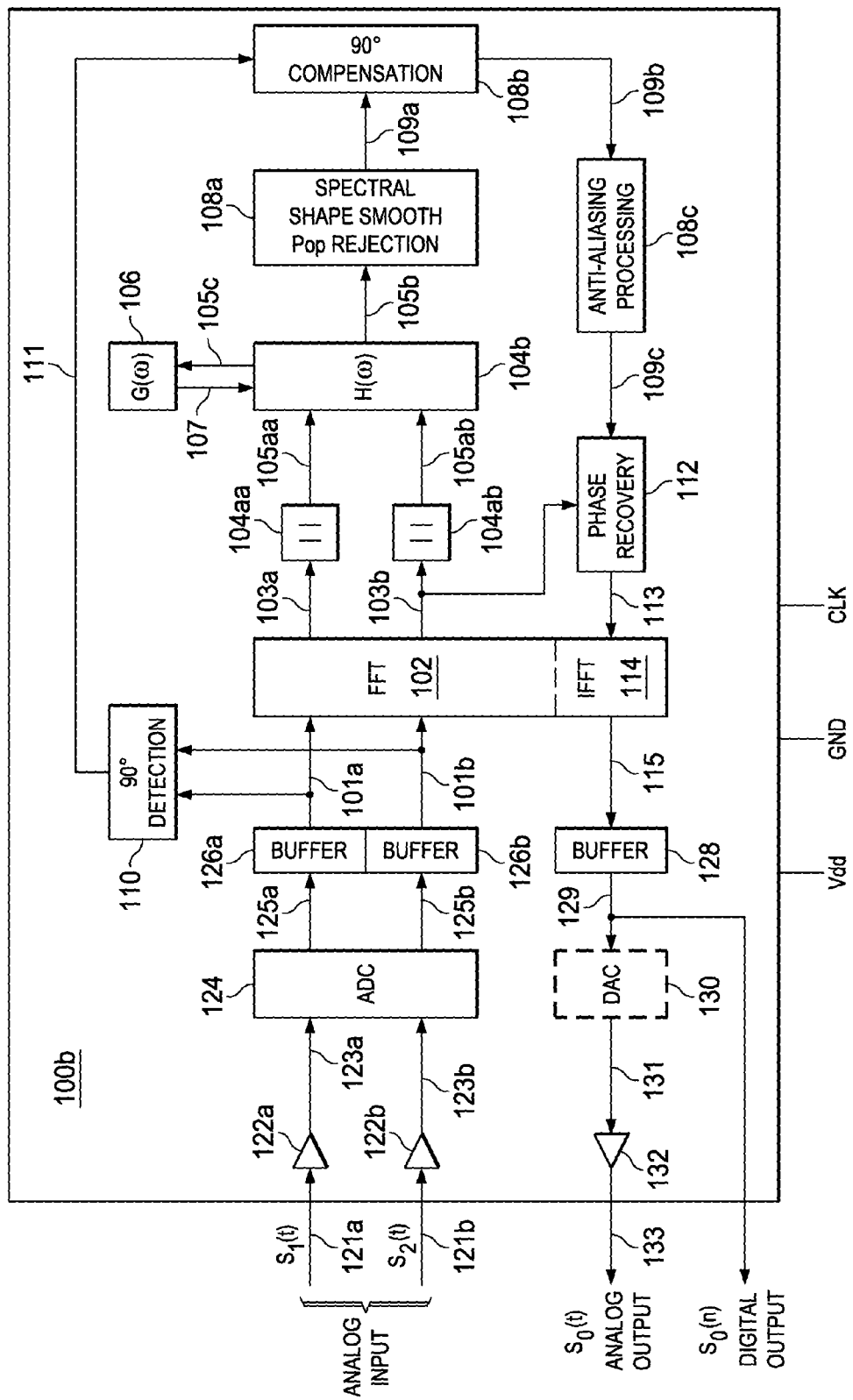
FIG. 5 is a block diagram for a frequency domain signal processor for a CTDMA in accordance with another embodiment of the presently claimed invention.

Referring to FIG. 5, a frequency domain signal processor for a CTDMA in accordance with another embodiment 100*b* of the presently claimed invention includes elements similar to those of FIG. 4, some of which are shown in greater detail, as well as additional elements. In this embodiment 100*b*, the estimation filter circuitry 104 includes magnitude detection circuits 104*aa*, 104*ab* which detect the magnitudes of the original frequency domain signals 103*a*, 103*b*. The detected magnitude signals 105*aa*, 105*ab*, as discussed in more detail below, are processed by the filter circuitry 104*b* using the calibration data 107. In this embodiment, 104*b*, an intermediate processed signal 105*c* may be used by the filter circuit 104*b* as a control signal for the calibration filter circuitry 106.

Analog input signals 121*a*, 121*b*, which originate from the microphones (not shown) are amplified by input amplifier circuits 122*a*, 122*b*, following which the amplified analog signals 123*a*, 123*b* are converted to corresponding digital signals 125*a*, 125*b* by analog-to-digital conversion (ADC) circuitry 124. These digital signals 125*a*, 125*b* are stored in buffers (e.g., registers) 126*a*, 126*b* to be made available as digital time domain signals 101*a*, 101*b* used by the FFT circuitry 102 and quadrature signal detection circuitry 110, as discussed above.

The time domain signal 115 generated by the IFFT circuitry 114 is a digital signal and is stored in another buffer 128 to be made available as a digital output signal 129, and to be converted to a corresponding analog signal 131 by digital-to-analog conversion circuitry 130. This analog signal 131 is amplified by an output amplifier circuit 132 to provide an analog output signal 133.

The received time domain digital signals 101*a*, 101*b* can be denoted as $y_1(n)$ and $y_2(n)$, where n is the time index. In a real-time application, the received signals 101*a*, 101*b* are sequentially processed using short frames. Each short frame of data is transformed from the time domain to the frequency domain using a FFT process 102. The short time spectrums of the resulting frequency domain signals 103*a*, 103*b* can be denoted as $Y_1(m, \omega)$ and $Y_2(m, \omega)$, where m is the frame index and $\omega$ is the angular frequency ($2\pi f$). Using Equation (2), the short time spectrum of the output can be expressed as $$Z(m, \omega) = (|Y_1(m, \omega)| - |Y_2(m, \omega)||G(\omega)|) \angle Y_2(m, \omega) \quad (6)$$

where G(w) is the frequency response of the calibration filter 106, which compensates for the frequency response differences of the two microphones, and $\angle Y_2(m, \omega)$ denotes the phase of the frequency domain signal 103*b* $Y_2(m, \omega)$ used later to establish the phase of the frequency domain output signal 113.

By defining the transfer function $H(m, \omega)$ of the estimation filter 104 as $$H(m, w) = \frac{|Y_1(m, w)| - |Y_2(m, w)||G(w)|}{|Y_2(m, w)|}, \quad (7)$$

Equation (6) can be rewritten as $$Z(m, \omega) = H(m, \omega) Y_2(m, \omega) \quad (8)$$

Hence the output signal is generated by filtering the selected frequency domain signal 103*b* $Y_2(m, \omega)$ with a real-valued filter 104 $H(m, \omega)$ on a frame-by-frame basis. The filter transfer function $H(m, \omega)$ determines the amount of the signal 103*b* $Y_2(m, \omega)$ that will remain in the output signal 105.

Given the spacing of the microphone forming the array and the range of the distance of the near-field source, the approximate range of the filter transfer function $H(m, \omega)$ can be estimated using a wave propagation model. For example, if the array spacing is 2 cm and the near-field source is within 1-6 cm, the magnitude $|H(m, \omega)|$ of the filter transfer function $H(m, \omega)$ should be in the approximate range of 0.25-2.0. With improved or more specific knowledge of the proper range of the filter transfer function $H(m, \omega)$, further improvements to the quality of the output signal can be realized.

Regarding signal spikes and pop noise, the value of the magnitude $|H(m, \omega)|$ of the filter transfer function $H(m, \omega)$ calculated from Equation (7) can sometimes exceed the range predicted by the wave propagation model due to random fluctuations in the magnitudes $|Y_2(m, \omega)|$ of the short time spectrums $Y_i(m, \omega)$. For example, the magnitude $|Y_2(m, \omega)|$ of the selected frequency domain signal 103*b* $Y_2(m, \omega)$ can be very small and result in a large filter transfer function magnitude $|H(m, \omega)|$. In such a case, large spikes can appear in the output signal 105 and may cause overflow in a fixed-point algorithm.

One effective way to avoid undesirable spikes is to limit the filter transfer function magnitude $|H(m, \omega)|$ below the maximum value predicted by the wave propagation model. This has been found to not only reduce signal spikes but also significantly reduce pop noise.

Pop noise is highly non-stationary and has a spectrum similar to that of white noise. This too can result in a large filter transfer function magnitude $|H(m, \omega)|$ and eventually generate audible pop noise in the output. It can be very difficult to handle in a conventional CTDMA because the high frequency components of the pop noise tend to be amplified. Hence, with a conventional CTDMA extra acoustic design considerations become necessary to minimize pop noise.

In accordance with the presently claimed invention, the highly non-stationary spectrum of pop noise can be compensated by limiting the maximum value of the filter transfer function magnitude $|H(m, \omega)|$. This advantageously allows the acoustic design requirements to be less demanding.

Regarding quadrature signal cancellation, when the received signal is dominated by either far-field interference or a near-field signal arriving at an angle of near 90 degrees relative to the desired signal, the magnitudes $|Y_1(m, \omega)|$, $|Y_2(m, \omega)|$ of the short time spectrums of the frequency domain signals 103a $Y_1(m, \omega)$, 103b $Y_2(m, \omega)$ tend to be approximately equal, thereby producing a small value for the filter transfer function magnitude $|H(m, \omega)|$. In the case of dominating far-field interference, the filter transfer function magnitude $|H(m, \omega)|$ should be allowed to approach zero so as to achieve maximum far-field interference reduction. However, in the case of a dominating near-field signal, the received signal is dominated by desired signals in the near-field, so allowing the filter transfer function magnitude $|H(m, \omega)|$ to become zero will cancel out most desired signals. To prevent excessive cancellation of a desired signal, a lower limit can be put on the filter transfer function magnitude $|H(m, \omega)|$. While setting this lower limit can result in less interference being reduced, such a lower limit can be designed to become activated only upon detection of a signal approaching from a near-field source with an angle of incidence near 90 degrees.

Regarding anti-alias processing, since the received signal is processed sequentially in short frames, overlap-add processing is performed in accordance with well known techniques (see, e.g., U.S. Pat. No. 6,173,255, the disclosure of which is incorporated herein by reference). Measures can also be taken to avoid aliasing caused by short frame processing in the frequency domain.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A circuit for processing microphone signals from a differential microphone array that includes a plurality of microphones each providing an analog microphone output, the circuit comprising:
    time-to-frequency domain conversion circuitry configured to receive time domain microphone signals corresponding to respective analog microphone outputs, and to provide corresponding respective frequency domain microphone signals characterized by frequency domain magnitude and phase signals; and
    frequency domain processing circuitry configured to process at least two frequency domain magnitude signals from respective microphones of the differential microphone array, and to provide a corresponding frequency domain processed magnitude signal;
    phase recovery circuitry configured to receive the frequency domain processed magnitude signal and at least one of the frequency domain microphone signals, and to provide a frequency domain resultant signal with magnitude information corresponding the frequency domain processed magnitude signal and phase information corresponding to the phase of the at least one frequency domain microphone signal; and
    frequency-to-time domain conversion circuitry configured to convert the frequency domain resultant signal to a time domain resultant signal.

2. The circuit of claim 1, wherein said time-to-frequency domain conversion circuitry comprises Fourier Transform circuitry.

3. The circuit of claim 1:
    further comprising analog-to-digital conversion (ADC) circuitry configured to receive analog time domain microphone signals corresponding to respective analog microphone outputs, and to provide corresponding respective digital time domain microphone signals; and
    wherein the time-to-frequency domain conversion circuitry is configured to receive the digital time domain microphone signals, and to provide the corresponding respective frequency domain microphone signals characterized by frequency domain magnitude and phase signals.

4. The circuit of claim 1, wherein the frequency domain processing circuitry comprises:
    signal magnitude detection circuitry configured to receive at least two frequency domain microphone signals and provide the corresponding at least two frequency domain magnitude signals; and
    signal spectrum shaping circuitry configured to receive the at least two frequency domain magnitude signals, perform signal shaping filtering and provide the frequency domain processed magnitude signal.

5. The circuit of claim 1, wherein the frequency domain processing circuitry comprises:
    signal magnitude detection circuitry configured to receive at least two frequency domain microphone signals, and provide the corresponding at least two frequency domain magnitude signals;
    signal spectrum shaping circuitry configured to receive the at least two frequency domain magnitude signals, perform signal shaping filtering and provide a filtered frequency domain processed magnitude signal; and
    anti-aliasing circuitry configured to receive the filtered frequency domain filtered signal, reduce signal aliasing, and provide the frequency domain processed magnitude signal.

6. The circuit of claim 1, wherein the frequency domain processing circuitry comprises:
    signal magnitude detection circuitry configured to receive at least two frequency domain microphone signals, and provide the corresponding at least two frequency domain magnitude signals;
    microphone compensation circuitry configured to provide a microphone compensation signal related to a difference in frequency response characteristics of at least two microphones providing the analog microphone outputs corresponding to the at least two frequency domain magnitude signals; and
    signal spectrum shaping circuitry configured to receive the at least two frequency domain magnitude signals and the microphone compensation signal, perform signal shaping filtering and microphone compensation and provide the frequency domain processed magnitude signal.

7. The circuit of claim 1, wherein said frequency domain processing circuitry comprises:

signal magnitude detection circuitry configured to receive at least two frequency domain microphone signals, and provide the corresponding at least two frequency domain magnitude signals;

microphone compensation circuitry configured to provide a microphone compensation signal related to a difference in frequency response characteristics of at least two microphones providing the analog microphone outputs corresponding to the at least two frequency domain magnitude signals; and signal spectrum shaping circuitry configured to receive the at least two frequency domain magnitude signals and the microphone compensation signal, perform signal shaping filtering and microphone compensation and provide a filtered frequency domain processed magnitude signal; and anti-aliasing circuitry configured to receive the filtered frequency domain filtered signal, reduce signal aliasing, and provide the frequency domain processed magnitude signal.

8. The circuit of claim 1, wherein said phase recovery circuitry comprises signal mixing circuitry.

9. The circuit of claim 1, wherein said frequency-to-time domain conversion circuitry comprises Inverse Fourier Transform (IFT) circuitry.

10. The circuit of claim 1, wherein the time domain resultant signal is a digital time domain resultant signal, and further comprising digital-to-analog conversion (DAC) circuitry coupled to said frequency-to-time domain conversion circuitry to convert said digital time domain resultant signal to an analog signal.

11. The circuit of claim 1:
further comprising quadrature phase detection circuitry responsive to at least two time domain microphone signals corresponding to the least two frequency domain magnitude signals, and configured to determine when the phase difference between the at least two time domain microphone signals is within a predetermined proximity to 90 degrees; and
wherein the frequency domain processing circuitry is configured to process the at least two frequency domain magnitude signals in relation to such 90 degree proximity determination, and provide the corresponding frequency domain processed magnitude signal.

12. A system for processing microphone signals, comprising:
a differential microphone array including a plurality of microphones each providing an analog microphone output;
time-to-frequency domain conversion circuitry configured to receive time domain microphone signals corresponding to respective analog microphone outputs, and to provide corresponding respective frequency domain microphone signals characterized by frequency domain magnitude and phase signals; and
frequency domain processing circuitry configured to process at least two frequency domain magnitude signals from respective microphones of the differential microphone array, and to provide a corresponding frequency domain processed magnitude signal;
phase recovery circuitry configured to receive the frequency domain processed magnitude signal and at least one of the frequency domain microphone signals, and to provide a frequency domain resultant signal with magnitude information corresponding the frequency domain processed magnitude signal and phase information corresponding to the phase of the at least one frequency domain microphone signal; and
frequency-to-time domain conversion circuitry configured to convert the frequency domain resultant signal to a time domain resultant signal.

13. The system of claim 12, wherein the frequency domain processing circuitry comprises:
signal magnitude detection circuitry configured to receive at least two frequency domain microphone signals and provide the corresponding at least two frequency domain magnitude signals; and
signal spectrum shaping circuitry configured to receive the at least two frequency domain magnitude signals, perform signal shaping filtering and provide the frequency domain processed magnitude signal.

14. The system of claim 12, wherein the frequency domain processing circuitry comprises:
signal magnitude detection circuitry configured to receive at least two frequency domain microphone signals, and provide the corresponding at least two frequency domain magnitude signals;
signal spectrum shaping circuitry configured to receive the at least two frequency domain magnitude signals, perform signal shaping filtering and provide a filtered frequency domain processed magnitude signal; and
anti-aliasing circuitry configured to receive the filtered frequency domain filtered signal, reduce signal aliasing, and provide the frequency domain processed magnitude signal.

15. The system of claim 12, wherein the frequency domain processing circuitry comprises:
signal magnitude detection circuitry configured to receive at least two frequency domain microphone signals, and provide the corresponding at least two frequency domain magnitude signals;
microphone compensation circuitry configured to provide a microphone compensation signal related to a difference in frequency response characteristics of at least two microphones providing the analog microphone outputs corresponding to the at least two frequency domain magnitude signals; and
signal spectrum shaping circuitry configured to receive the at least two frequency domain magnitude signals and the microphone compensation signal, perform signal shaping filtering and microphone compensation and provide the frequency domain processed magnitude signal.

16. The system of claim 12, wherein said frequency domain processing circuitry comprises:
signal magnitude detection circuitry configured to receive at least two frequency domain microphone signals, and provide the corresponding at least two frequency domain magnitude signals;
microphone compensation circuitry configured to provide a microphone compensation signal related to a difference in frequency response characteristics of at least two microphones providing the analog microphone outputs corresponding to the at least two frequency domain magnitude signals; and
signal spectrum shaping circuitry configured to receive the at least two frequency domain magnitude signals and the microphone compensation signal, perform signal shaping filtering and microphone compensation and provide a filtered frequency domain processed magnitude signal; and anti-aliasing circuitry configured to receive the filtered frequency domain filtered signal, reduce signal aliasing, and provide the frequency domain processed magnitude signal.

17. The system of claim 12:

further comprising quadrature phase detection circuitry responsive to at least two time domain microphone signals corresponding to the least two frequency domain magnitude signals, and configured to determine when the phase difference between the at least two time domain microphone signals is within a predetermined proximity to 90 degrees; and wherein the frequency domain processing circuitry is configured to process the at least two frequency domain magnitude signals in relation to such 90 degree proximity determination, and provide the corresponding frequency domain processed magnitude signal.

18. A method of processing microphone signals from a differential microphone array that includes a plurality of microphones each providing an analog microphone output, the circuit comprising:

receiving time domain microphone signals corresponding to respective analog microphone outputs;

generating corresponding respective frequency domain microphone signals characterized by frequency domain magnitude and phase signals;

processing at least two frequency domain magnitude signals from respective microphones of the differential microphone array to provide a corresponding frequency domain processed magnitude signal;

generating, in response to the frequency domain processed magnitude signal and at least one of the frequency domain microphone signals, a frequency domain resultant signal with magnitude information corresponding the frequency domain processed magnitude signal and phase information corresponding to the phase of the at least one frequency domain microphone signal; and converting the frequency domain resultant signal to a time domain resultant signal.

19. The method of claim 18, further comprising:

providing a microphone compensation signal related to a difference in frequency response characteristics of at least two microphones that provide the analog microphone outputs corresponding to the at least two frequency domain magnitude signals; and wherein processing the at least two frequency domain magnitude signals comprises processing, in relation to the microphone compensation signal, the at least two frequency domain magnitude signals to provide a corresponding frequency domain processed magnitude signal.

20. The method of claim 18:

determining when the phase difference between the at least two time domain microphone signals is within a predetermined proximity to 90 degrees; and wherein processing the at least two frequency domain magnitude signals comprises processing at least two frequency domain magnitude signals in relation to such 90 degree proximity determination to provide a corresponding frequency domain processed magnitude signal.

\* \* \* \* \*